US011383335B2

United States Patent
Bullock et al.

(10) Patent No.: US 11,383,335 B2
(45) Date of Patent: Jul. 12, 2022

(54) INSERTION TOOL

(71) Applicant: ROLLS-ROYCE plc, London (GB)

(72) Inventors: Martin C Bullock, Rochdale (GB); George S Walsh, Coventry (GB); Martin W Denmark, Willenhall (GB); Dejan Basu, London (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/062,704

(22) Filed: Oct. 5, 2020

(65) Prior Publication Data

US 2021/0107101 A1     Apr. 15, 2021

(30) Foreign Application Priority Data

Oct. 15, 2019  (GB) ...................................... 1914883

(51) Int. Cl.
  *B23P 19/06* (2006.01)
  *B23P 19/12* (2006.01)

(52) U.S. Cl.
  CPC ............. *B23P 19/065* (2013.01); *B23P 19/12* (2013.01)

(58) Field of Classification Search
  CPC ..... B23P 19/065; B23P 19/063; B23P 19/105; B23P 19/12; B25B 27/143
  See application file for complete search history.

(56) References Cited

U.S. PATENT DOCUMENTS

| 4,501,176 | A |   | 2/1985  | Sanders        |            |
|-----------|---|---|---------|----------------|------------|
| 4,967,472 | A |   | 11/1990 | Ebihara et al. |            |
| 5,040,277 | A | * | 8/1991  | Dessouky       | B25B 27/143 |
|           |   |   |         |                | 29/240     |
| 5,065,494 | A |   | 11/1991 | Ebihara et al. |            |

(Continued)

FOREIGN PATENT DOCUMENTS

| DE | 4301328 A1  | 7/1994 |
| FR | 2 415 521 A1 | 8/1979 |

(Continued)

OTHER PUBLICATIONS

Mar. 11, 2021 extended Search Report issued in European Patent Application No. 20200309.1.

(Continued)

*Primary Examiner* — Sarang Afzali
(74) *Attorney, Agent, or Firm* — Oliff PLC

(57) ABSTRACT

An apparatus for securing an insert in a hole, the insert having an axis, a section comprising a thread disposed around the axis and a section comprising a plurality of splines, and the hole having a section comprising a corresponding thread and a section comprising a plurality of grooves corresponding to said splines, the apparatus comprising a driver arranged to rotate the insert, a torque measurement device arranged to measure the driving torque applied by the driver, and a controller arranged to cause the driver to drive the insert into the hole until the splines are level in the axial direction with the grooves by rotating the insert in a first direction, and align the splines with the (Continued)

grooves by causing the driver to further rotate the threaded insert whilst measuring the driving torque using the torque measuring device, and stopping the further rotation based on the measured driving torque.

11 Claims, 3 Drawing Sheets

(56) References Cited

U.S. PATENT DOCUMENTS

| | | | |
|---|---|---|---|
| 7,350,286 B2* | 4/2008 | Asano | B23P 19/02 173/176 |
| 8,474,118 B2* | 7/2013 | Hondo | B25B 27/143 29/240.5 |
| 11,033,952 B2* | 6/2021 | Chan | B21J 15/32 |
| 2006/0204348 A1 | 9/2006 | Shuart | |
| 2007/0245533 A1* | 10/2007 | Szewc | B25B 27/143 29/240.5 |
| 2012/0272491 A1 | 11/2012 | Hondo | |
| 2019/0240791 A1 | 8/2019 | Bullock et al. | |

FOREIGN PATENT DOCUMENTS

| | | |
|---|---|---|
| GB | 768600 A | 2/1957 |
| GB | 2570883 A | 8/2019 |
| WO | 2013/070647 A2 | 5/2013 |

OTHER PUBLICATIONS

Mar. 23, 2020 Search Report issued in British Patent Application No. 1914883.2.

* cited by examiner

INSERTION TOOL

This specification is based upon and claims the benefit of priority from UK Patent Application Number GB 1914883.2 filed on 15 Oct. 2019, the entire contents of which are incorporated herein by reference.

BACKGROUND

Field of the Disclosure

The present disclosure relates to an apparatus for securing an insert in a hole, and a method of securing an insert in a hole.

Background of the Disclosure

Inserts, and in particular, thin-walled inserts, are used in many applications to provide improved mounting of components. Such inserts typically take the form of a hollow tube, and have a thread on the outside surface of the tube to allow the insert to be driven into a hole in a component with a corresponding thread. The inserts also typically have, at one end, a series of splines (or teeth), which, during insertion of the insert, are aligned with a set of corresponding grooves in the hole. After the splines are aligned with the groves, the insert is swaged (i.e. deformed using a tool) such that the splines engage with the grooves to secure it in position in the hole, and a torque test is carried out to verify that the insert is secured in the hole.

The step of aligning the splines with the grooves is typically carried out manually using a magnifying glass (due to the size of the splines) to ensure that the splines and grooves are aligned with each other. The swaging is typically carried out manually using a hammer and a punch. These operations may be time-consuming, and may rely on the manual operations being very precise.

The present disclosure aims to provide an improved process.

SUMMARY OF THE DISCLOSURE

According to a first aspect, there is provided an apparatus for securing an insert in a hole, the insert having an axis, a section comprising a thread disposed around the axis and a section comprising a plurality of splines, and the hole having a section comprising a corresponding thread and a section comprising a plurality of grooves corresponding to said splines, the apparatus comprising a driver arranged to rotate the insert, a torque measurement device arranged to measure the driving torque applied by the driver, and a controller arranged to cause the driver to drive the insert into the hole until the splines are level in the axial direction with the grooves by rotating the insert in a first direction, and align the splines with the grooves by causing the driver to further rotate the threaded insert whilst measuring the driving torque using the torque measuring device, and stopping the further rotation based on the measured driving torque.

The further rotation may be in a second direction opposite to the first direction.

The further rotation may be of 15 degrees or less.

The further rotation may be stopped when the driving torque is at a minimum.

The apparatus may further comprise a swaging tool arranged to swage the insert.

The controller may be arranged to cause the driver to apply a test torque to the insert after swaging of the insert to determine whether the insert is secured in the hole.

The apparatus may further comprise a stop arranged to define the depth at which the splines are level in the axial direction with the grooves.

The apparatus may further comprise a sensor arranged to detect the depth to which the insert has been driven and/or to determine that the insert has reached the depth at which the splines are level in the axial direction with the grooves.

The insert may have a distal end configured to be first introduced into the hole and a proximal end at the opposite end of the insert to the distal end. The splines may be located at the proximal end of the insert.

The driver may have a threaded portion arranged to interact with a corresponding thread provided on an interior surface of the insert to detachably connect the driver to the insert during driving of the insert.

The apparatus may further comprise a detector arranged to detect a hole into which an insert is to be inserted, and an actuator configured to align the driver with a detected hole.

The apparatus may be arranged to secure a plurality of respective said inserts into a plurality of respective said holes by moving at least the driver relative to a workpiece in which the holes are disposed, and detecting each of the plurality of holes using the detection portion.

According to a second aspect, there is provided a method of securing an insert in a hole, the insert having an axis, a section comprising a thread disposed around the axis and a section comprising a plurality of splines, and the hole having a section comprising a corresponding thread and a section comprising a plurality of grooves corresponding to said splines, the method comprising driving the insert into the hole until the splines are level in the axial direction with the grooves by rotating the insert in a first direction, and aligning the splines with the grooves by further rotating the threaded insert whilst measuring the driving torque, and stopping the further rotation based on the measured driving torque.

The further rotation may be in a second direction opposite to the first direction.

The further rotation may be of 15 degrees or less.

The further rotation may be stopped when the driving torque is at a minimum.

The method may further comprise swaging the insert.

The method may further comprise applying a test torque to the insert after swaging of the insert to determine whether the insert is secured in the hole.

BRIEF DESCRIPTION OF THE DRAWINGS

Embodiments will now be described, by way of example only, with reference to the Figures, in which.

DETAILED DESCRIPTION OF THE DISCLOSURE

Aspects and embodiments of the present disclosure will now be discussed with reference to the accompanying Figures. Further aspects and embodiments will be apparent to those skilled in the art.

Figure 1:
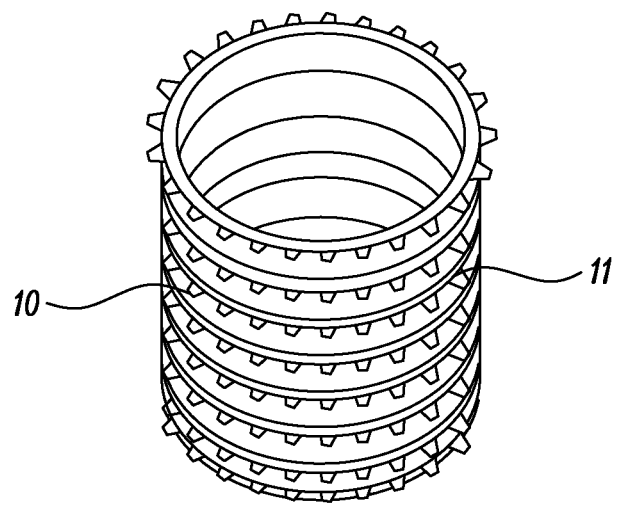
FIG. 1 is a perspective view of an insert.

FIG. 1 shows a perspective view of an insert, and in particular a thin-walled insert. The insert has a generally tubular form (i.e. the form of a hollow cylinder). The axis of the cylinder therefore forms an axis of the insert. The insert also has a threaded section on its exterior surface. The threaded section has a thread 10 which is disposed around the axis. In other words, the thread is centred on and spirals around the axis. The insert also includes a splined section at one axial end of the insert comprising a plurality of splines 11. That is, there are a number of splines, or teeth, located at one end of the insert.

The insert is arranged to be inserted and secured into a hole in a component, such as a component of a gas turbine engine. In particular, the component may be a bearing housing, any other part of a gas turbine engine, or any other component into which inserts are used to line a hole.

When the insert is inserted into a hole, the end of the insert which is first inserted into a hole can be considered as the distal end of the insert. The proximal end of the insert is then the part of the insert which is nearest to the surface of the component which the hole is located. Typically, the splined section of the insert may be located at the proximal end of the insert.

Figure 2:
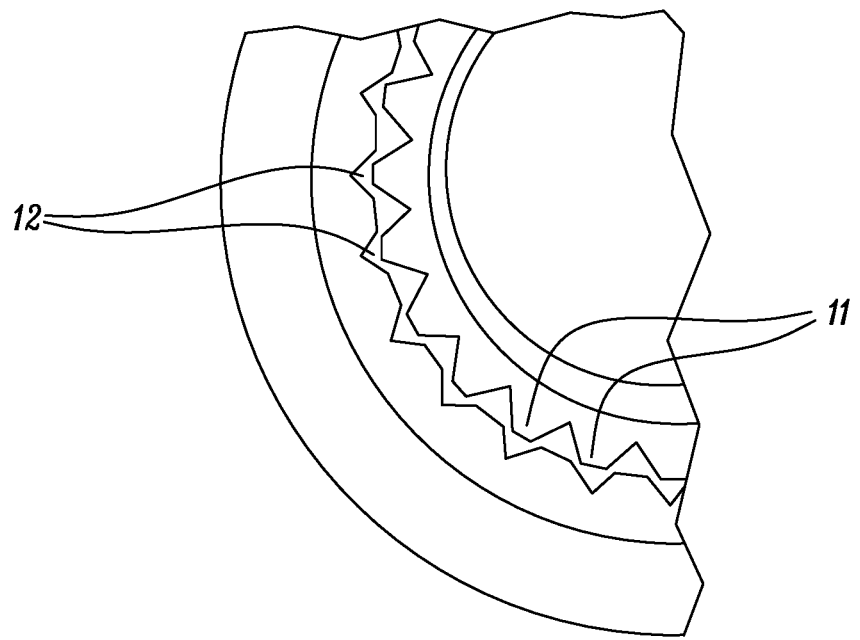
FIG. 2 is a partial close-up view of an insert when located in a hole.

FIG. 2 shows a close up of a section of the insert when located in a hole. It will be seen that the hole includes a plurality of grooves 12, at the end of the hole nearest the surface in which the hole is bored, which correspond to the splines on the insert. That is, the grooves take the form of notches which have a shape corresponding to the shape of the splines 11, such that the splines may fit into the shape of the grooves. The hole also has a corresponding thread 13 which corresponds to the thread 10 of the insert (i.e. is configured to interact with the thread of the insert).

Figure 3:
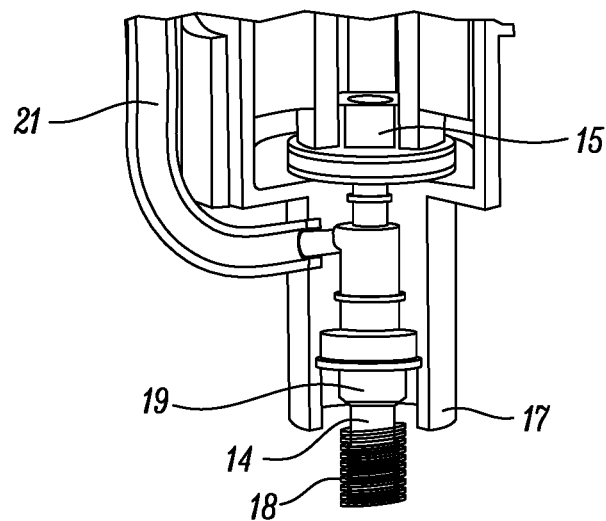
FIG. 3 is a cutaway view of an apparatus for securing an insert in a hole.

FIG. 3 shows a cutaway view of an apparatus according to the present disclosure for securing the insert in the hole. The apparatus includes a driver 14 arranged to rotate the insert. The driver may be motorised, and thus acts like a motorised screwdriver, which can drive the threaded insert into the hole. The driver shown in FIG. 3 has a substantially cylindrical shape, but it will be understood that the driver may be of any suitable form for driving the insert into the hole.

Figure 5:
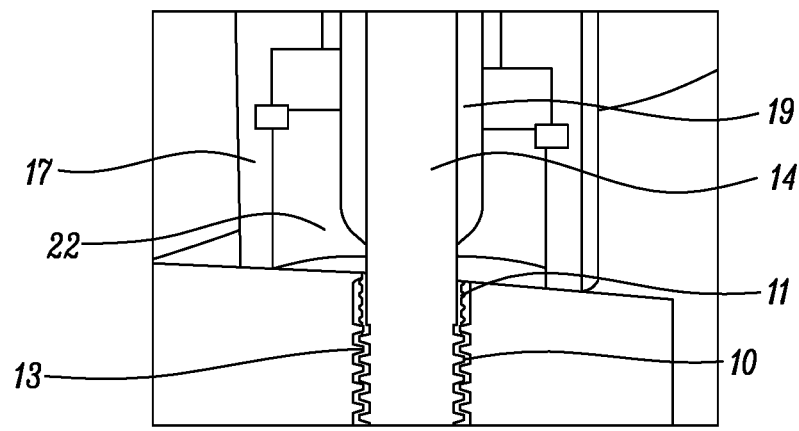
FIG. 5 is a close-up cross-sectional view of the apparatus and insert during driving of the insert.

In some arrangements, the driver 14 may comprise a thread on its outside surface (i.e. the surface which interacts with the insert). As shown in FIG. 5, the insert may have a corresponding thread on its interior surface (as well as on its exterior surface, as explained above), and the threaded portion 18 of the driver may interact with the interior surface of the insert to allow the insert to be detachably connected to, and driven by, the driver. That is, the threaded portion 18 of the driver 14 allows the driver to be positioned relative to the insert during driving of the insert. It will be understood that, when the insert has a thread on both its interior and exterior surfaces, the threads may not be the same size, and may have different geometries (e.g. different pitches).

The apparatus further comprises a torque measurement device 15 which is arranged to measure the driving torque applied by the driver 14. The torque measurement device may use a strain gauge to measure the driving torque, or may use any other suitable arrangement for measuring the tool applied by the driver.

The apparatus further comprises a controller 16 which is arranged to control the functions of the apparatus, and to receive the measurement of the driving torque from the torque measurement device. During insertion and securing of the insert in the hole, the controller first causes the driver to drive the insert into the hole until the splines are level (i.e. aligned) in the axial direction with the grooves by rotating the insert in a first direction. That is, the driver drives (or screws) the insert into the hole until the splines are level with the corresponding grooves.

Then, the controller 16 causes the apparatus to carry out a process of aligning (in the circumferential direction) the splines with the grooves. The controller 16 causes the driver to further rotate the threaded insert whilst measuring the driving torque using the torque measuring device. When this further rotation is carried out, the driving torque oscillates due to the interaction between the splines and the grooves. That is, the splines contact (or "brush past") the grooves periodically, which cause an increase in the driving torque required, and when the splines are not in contact with the grooves, the required driving torque reduces.

The further rotation is then stopped based on the measured driving torque. That is, it is determined that the splines are aligned with the grooves when the driving torque is at a minimum (i.e. are not in the process of "brushing past" the outer edges of the grooves).

It will be understood that, although the driving torque is at a minimum when the splines are aligned with the grooves, the controller may not stop the driving at exactly the point where the driving torque is at a minimum during its oscillation.

The point in time at which the controller stops the further rotation may be offset relative to the time when the driving torque is at a minimum, for example, to take account of delays in the command travelling from the controller to the driver.

In some arrangements, the further rotation may be in the opposite direction to the first direction. The further rotation may also be of 15 degrees or less. This may ensure that the insert stays axially aligned with the grooves and thus the proximal end of the hole. That is, it may prevent the insert from being driven too far into the hole, or partially removed from the hole.

The apparatus may also be arranged to apply a radially outward force in the region of the insert which has the splines during the further rotation. This may cause part of the insert to flare outward a small amount, which may move the splines closer to the grooves. This may provide easier measurement of the oscillating driving torque, due to the splines being closer to, and thus having more contact with, the grooves. The radially outward force may be applied using the swaging tool 19 (described below), or using any other suitable part of the apparatus. In some arrangements, the radially outward force may cause an elastic deformation of the insert.

The apparatus may further comprise a swaging tool 19 arranged to swage the insert. That is, the swaging tool 19 is arranged to apply a force to the insert in order to deform it to thereby increase its diameter. This may drive each spline into a corresponding groove. In turn, this may prevent the insert from further moving in the hole, securing it in the hole. The deformation may be an elastic deformation.

Figure 4:
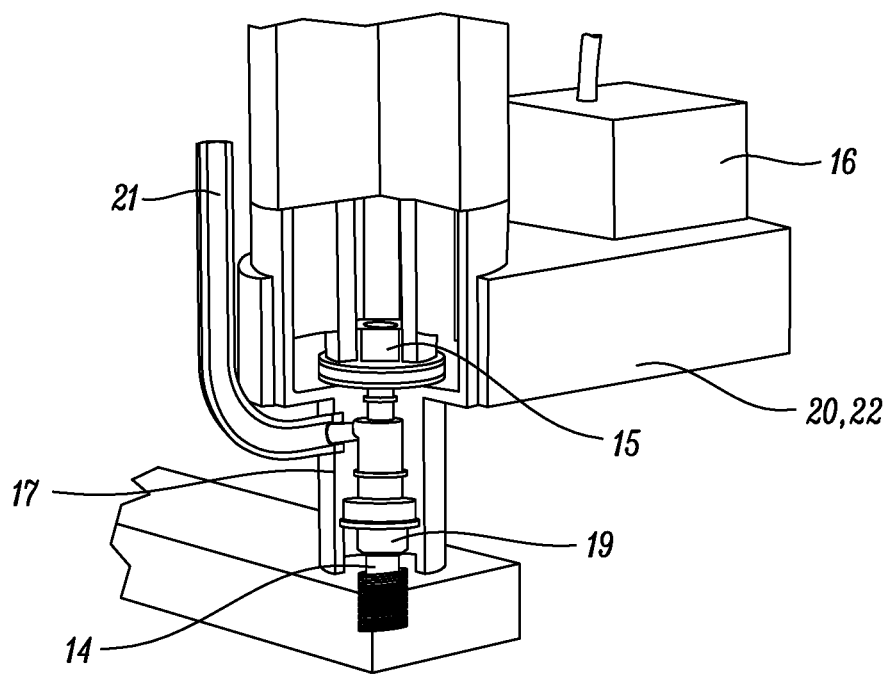
FIG. 4 is a cutaway view of the apparatus for securing an insert in hole during the insertion procedure.
Figure 6:
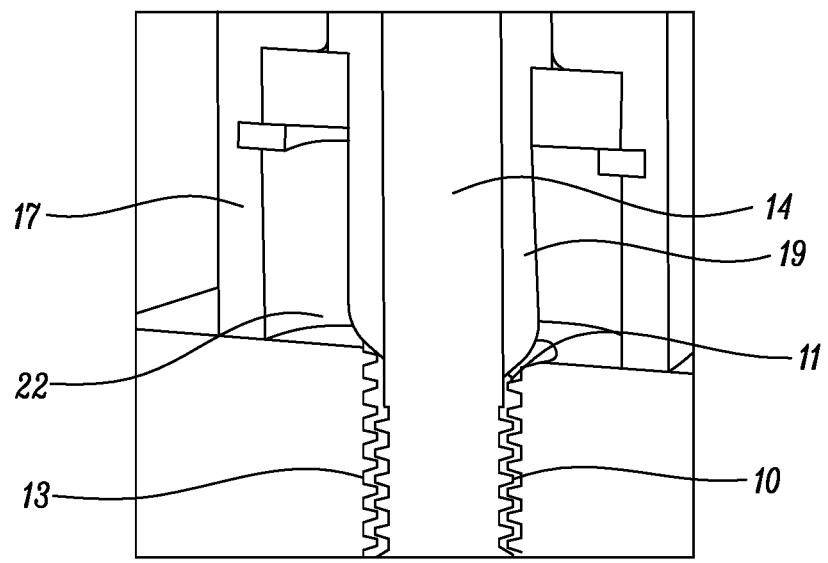
FIG. 6 shows a close-up cross-sectional view of the apparatus and insert during swaging of the insert.

As shown in FIGS. 3 and 4, the swaging tool 19 may be a pneumatic cylinder, which is arranged to move in a direction parallel to the axial direction. The pneumatic cylinder may have an axis which is substantially parallel, and in particular, coincident with, the axis of the driver 14. As shown in FIGS. 5 and 6, the swaging tool 19 may have an angled part 22, which decreases in circumference at its distal end. The circumference of the angled part 22 may be less than the circumference of the insert such that, when the swaging tool 19 is lowered into contact with the insert, the distal end of the swaging tool 19 is inside the proximal end of the insert. When the swaging tool is further lowered, the increasing diameter of the angled part in contact with the insert pushes the walls of the insert radially outward. Thus, when the swaging tool 19 is in the position shown in FIG. 6, it can apply a radially outward force to the inside of the insert, which causes the insert to be deformed such that its diameter increases. The deformation may be a plastic deformation. FIG. 6 shows the swaging tool 19 during the process of swaging (i.e. in contact with the proximal end of the insert. The swaging tool 19 may be powered by an air supply 21, or may be powered by other means (such as electrically or hydraulically).

After the swaging is carried out, the controller 16 may cause the driver 14 to apply a test torque to the insert. The application of the test torque may include further applying a command to rotate the driver 14, whilst measuring the torque applied using the torque measurement device 15. If, at a particular measured torque (which may be predetermined, or may be input to the controller depending on the application), the driver is unable to rotate, then it is determined that the insert has been successfully secured. Thus, the torque test may be used to verify whether the insert is properly secured in the hole.

As shown in FIGS. 3 and 4, the apparatus may further comprise a stop (or shoulder) 17. The stop may be a part which defines the depth at which the splines are level in the axial direction with the grooves. In other words, the stop 17 is at a fixed axial position relative to the driver, and prevents the driver from driving the insert to a depth lower than the correct depth by contacting the surface, thus preventing the driver from moving further in the axial direction. That is, the driver drives the insert into the hole until the stop (or shoulder) is in contact with the surface in which the hole is located.

The stop 17 may, as shown in FIGS. 3 and 4, be the outer end of a substantially hollow cylinder, with a larger radius than that of the driver and the swaging tool 19. The stop 17, the driver 14 and the swaging tool 19 may all have axes which are coincident. This may allow the swaging tool to move in the axial direction to contact the insert, and to retract into the cylinder when not in use.

Further, a sensor 22 may be provided instead of, or in addition to, the stop 17. The sensor 22 may be used to detect the depth to which the insert has been driven, and thus determine (or detect) that the insert has reached the depth at which the splines are level in the axial direction with the grooves. The sensor 22 may interact with the driver such that the driver stops driving the insert based on the output of the sensor. In some arrangements, the sensor may detect its position relative to the surface in which the hole is located in order to determine the depth to which the insert has been driven. The sensor may be located on any suitable part of the apparatus, such as adjacent the driver.

It will further be understood that any suitable part which allows the driver to drive the insert into the hole up to a certain depth, or detect the depth to which the driver has driven the insert, may be used to determine the depth at which the splines are level in the axial direction with the grooves. When a shoulder or stop is used, it will be understood that the position of the shoulder may be adjusted relative to the driver, according to the size of the insert and the depth to which the insert is to be driven into the hole.

The apparatus may further comprise a detector 20 arranged to detect a hole into which an insert is to be inserted. The detector may be, for example, a camera, or any other suitable detector. The apparatus, or a part thereof, may further be arranged to move relative to the component in which the holes are located, to thereby align the driver with a detected hole. For example, the whole apparatus may move, only the driver may move, or a subset of parts of the apparatus (e.g. the driver, torque measurement device, the swaging tool and stop) may move. The movement may be provided using an actuator. Thus, when the detector detects the hole into which the insert is to be inserted and secured, it may position the apparatus such that the driver is aligned with the hole. In some arrangements, the detector 20 may also be combined with a sensor 22 used to detect the depth to which the insert has been driven, as described above.

The apparatus may also be arranged to carry out the process of securing the insert into a hole multiple times, for a plurality of inserts and a plurality of holes. In other words, the apparatus may repeat the process described above multiple times. In such an arrangement, each of the plurality of holes may be detected using the detector 20, and the apparatus (or part thereof, as described above) may move between each of the holes such that a series of inserts are inserted and secured in the hole.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An apparatus for securing an insert in a hole, the insert being threaded and having an axis, a section comprising a thread disposed around the axis and a section comprising a plurality of splines, and the hole having a section comprising a corresponding thread and a section comprising a plurality of grooves corresponding to said splines, the apparatus comprising:
   a driver arranged to rotate the insert;
   a torque measurement device arranged to measure a driving torque applied by the driver;
   a controller arranged to:
      cause the driver to drive the insert into the hole until the splines are level in an axial direction with the grooves by rotating the insert in a first direction; and
      align the splines with the grooves by:
         causing the driver to further rotate the threaded insert whilst measuring the driving torque using the torque measuring device; and
         stopping the further rotation based on the measured driving torque;
   a detector arranged to detect a hole into which an insert is to be inserted; and
   an actuator configured to align the driver with a detected hole.

2. The apparatus of claim 1, further comprising a swaging tool arranged to swage the insert.

3. The apparatus of claim 2, wherein the controller is arranged to cause the driver to apply a test torque to the insert after swaging of the insert to determine whether the insert is secured in the hole.

4. The apparatus of claim 1, wherein the further rotation is in a second direction opposite to the first direction.

5. The apparatus of claim 1, wherein the further rotation is of 15 degrees or less.

6. The apparatus of claim 1, wherein
the driving torque has a minimum torque value and a maximum torque value, and
the further rotation is stopped when the driving torque is at the minimum torque value.

7. The apparatus of claim 1, further comprising a stop arranged to define a depth at which the splines are level in the axial direction with the grooves.

8. The apparatus of claim 1, further comprising:
a sensor configured to perform at least one of: detecting a depth to which the insert has been driven; and determining that the insert has reached the depth at which the splines are level in the axial direction with the grooves.

9. The apparatus of claim 1, wherein the insert has a distal end configured to be first introduced into the hole and a proximal end at the opposite end of the insert to the distal end, and wherein the splines are located at the proximal end of the insert.

10. The apparatus of claim 1, wherein the driver has a threaded portion arranged to interact with a corresponding thread provided on an interior surface of the insert to detachably connect the driver to the insert during driving of the insert.

11. The apparatus of claim 1, wherein the apparatus is arranged to secure a plurality of respective said inserts into a plurality of respective said holes by moving at least the driver relative to a workpiece in which the holes are disposed, and detecting each of the plurality of holes using the detector.

* * * * *